US009151851B2

(12) United States Patent
Fries et al.

(10) Patent No.: US 9,151,851 B2
(45) Date of Patent: Oct. 6, 2015

(54) MULITPLEXING DEVICE FOR A MEDICAL IMAGING SYSTEM

(71) Applicant: GENERAL ELECTRIC COMPANY, Schenectady, NY (US)

(72) Inventors: Mark David Fries, Waukesha, WI (US); David Leo McDaniel, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 13/929,006

(22) Filed: Jun. 27, 2013

(65) Prior Publication Data

US 2015/0001399 A1  Jan. 1, 2015

(51) Int. Cl.
*G01T 1/161*    (2006.01)
*G01T 1/29*     (2006.01)
*G01T 1/164*    (2006.01)
*G01T 1/172*    (2006.01)

(52) U.S. Cl.
CPC ............... *G01T 1/2985* (2013.01); *G01T 1/161* (2013.01); *G01T 1/1647* (2013.01); *G01T 1/172* (2013.01)

(58) Field of Classification Search
CPC .......................................................... G04F 3/00
See application file for complete search history.

(56) References Cited

U.S. PATENT DOCUMENTS

| 6,204,711 | B1 * | 3/2001 | Scarlett et al. ................. 327/291 |
| 6,232,604 | B1 * | 5/2001 | McDaniel et al. ........ 250/363.03 |
| 7,030,382 | B2 | 4/2006 | Williams |
| 7,129,495 | B2 | 10/2006 | Williams |
| 7,132,663 | B2 | 11/2006 | Williams |
| 8,269,117 | B2 | 9/2012 | Hoeland |
| 2005/0286682 | A1 | 12/2005 | Tkaczyk |

* cited by examiner

*Primary Examiner* — Casey Bryant
(74) *Attorney, Agent, or Firm* — Dean D. Small; The Small Patent Law Group, LLC.

(57) ABSTRACT

A multiplexing circuit for a positron emission tomography (PET) detector includes a delay circuit and a multiplexer communicating with the delay circuit. The delay circuit configured to receive a plurality of timing pickoff (TPO) signals from a plurality of positron emission tomography (PET) detector units, add a delay time to at least one of the plurality of TPO signals, and transmit the TPO signals based on the delay time to the multiplexer, the multiplexer configured to a multiplex the TPO signals and output a single TPO signal from the plurality of TPO signals to a Time-to-Digital Convertor (TDC). A method of operating a multiplexer and a imaging system including a multiplexer are also provided.

20 Claims, 11 Drawing Sheets

MULITPLEXING DEVICE FOR A MEDICAL IMAGING SYSTEM

BACKGROUND OF THE INVENTION

The subject matter described herein relates generally to medical imaging systems, and more particularly, to a multiplexing device utilized in a medical imaging system.

In PET imaging, the general locations of annihilation photons impacting a detector are recorded. The outputs from the detector are then utilized to reconstruct an image of a patient. More specifically, when a photon impacts a crystal on the detector, the crystal generates a signal. When the signal exceeds a predetermined threshold, an event detection pulse (EDP) is generated. The EDP is then provided to a processor coincidence circuitry which identifies approximately simultaneous EDP pairs which correspond to crystals in the detector which are generally on opposite sides of an imaging area.

The processor coincidence circuitry includes a Time-to-Digital Convertor (TDC) to measure the arrival time of the detected annihilation photons by measuring a time difference between annihilation events using a universal clock. More specifically, the TDCs measure the arrival time of each of the detected photons by measuring a time difference between pulses generated by the universal clock and a leading edge of a logic signal generated by a timing pick off circuit (TPO). Thus, a simultaneous pulse pair indicates that an annihilation event has occurred on a straight line between an associated pair of crystals. Over an acquisition period of a few minutes, millions of annihilation events are recorded, wherein each annihilation event is associated with a unique crystal pair in the detector.

However, high-resolution TDCs are generally large in size and consume relatively large quantities of power to operate effectively. Thus, at least one known detector combines multiple signals output from the detector to reduce a quantity of signals processed by the TDCs thus reducing the power consumed by the TDCs and also reducing the quantity of TDCs utilized to process the signals.

However, for silicon photomultiplier (SiPM) based detectors, the dark pulse rate generated by thermal created electron-hole pairs may affect the timing resolution of the SiPM based detectors. For example, as the dark pulse rate increases, the timing performance is reduced. As a result, the dark pulse rate in a TPO circuit increases linearly with the total area of the SiPM's being processed by each TPO. The detector's timing performance is therefore affected by the area processed by the TPO resulting in a relatively large quantity of TPO circuits being utilized to process the signals.

More specifically, to achieve an optimal timing performance, a TPO circuit is used for each crystal. However, if a TDC is utilized for each crystal, the quantity of TDCs in the detector becomes large thus increasing the power consumed.

SUMMARY OF INVENTION

In one embodiment, a multiplexing circuit for a positron emission tomography (PET) detector is provided. The multiplexing circuit includes a delay circuit and a multiplexer communicating with the delay circuit. The delay circuit configured to receive a plurality of timing pickoff (TPO) signals from a plurality of positron emission tomography (PET) detector units, add a delay time to at least one of the plurality of TPO signals, and transmit the TPO signals based on the delay time to the multiplexer, the multiplexer configured to a multiplex the TPO signals and output a single TPO signal from the plurality of TPO signals to a Time-to-Digital Convertor (TDC).

In another embodiment, an imaging system is provided. The imaging system includes a gantry, a detector coupled to the gantry, the detector including a plurality of detector units, and a multiplexing circuit coupled to the plurality of detector units. The multiplexing circuit includes a delay circuit and a multiplexer communicating with the delay circuit. The delay circuit configured to receive a plurality of timing pickoff (TPO) signals from a plurality of positron emission tomography (PET) detector units, add a delay time to at least one of the plurality of TPO signals, and transmit the TPO signals based on the delay time to the multiplexer, the multiplexer configured to a multiplex the TPO signals and output a single TPO signal from the plurality of TPO signals to a Time-to-Digital Convertor (TDC).

In a further embodiment, a method of operating an imaging system that includes a multiplexing circuit is provided. The method includes receiving, at a delay circuit, a plurality of timing pickoff (TPO) signals generated by a plurality of detector units, adding a delay time to at least one of the plurality of TPO signals, transmitting the TPO signals based on the delay time to a multiplexer, multiplexing the TPO signals using the multiplexer, transmitting a single TPO signal from the multiplexer to a Time-to-Digital Convertor (TDC), and identifying which detector unit generated the single TPO signal based on a delay time added to the single TPO signal.

DETAILED DESCRIPTION

Figure 1:
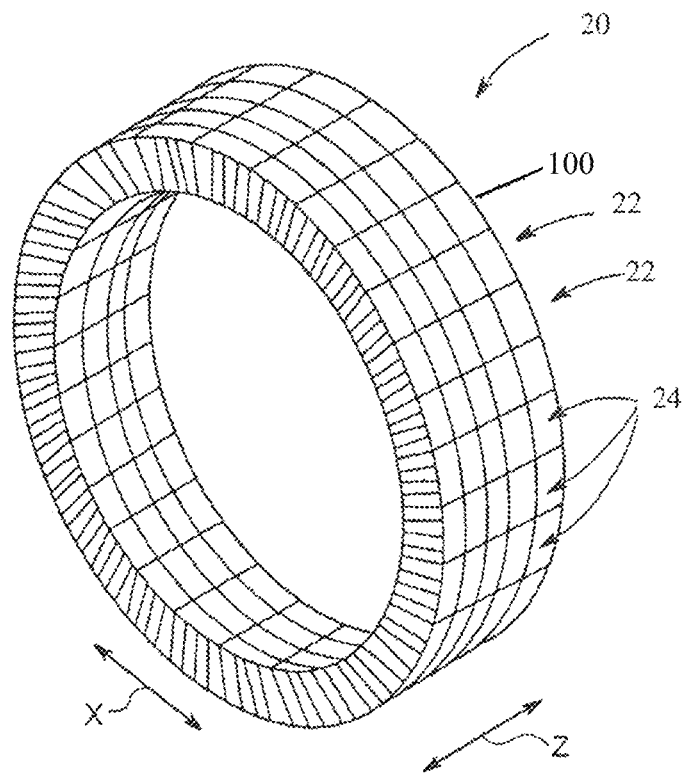
FIG. 1 is a perspective view of a positron emission tomography (PET) detector assembly in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for multiplexing multiple (N) channel signals into a single signal for efficient processing by a time-to-digital (TDC) converter without significantly affecting the event rate performance of the signals. Each of the N signals is a series of high-bandwidth pulses with random arrival times, random rates and/or random pulse-widths. The systems and methods utilize a plurality of delay circuits, per input signal, to delay when an individual signal enters a multiplexer based on when each signal arrives at the multiplexer. Accordingly, multiple signals having approximately the same arrival time at an input side of a plurality of delay lines, have a deterministic delay and a staggered arrival time at the multiplexer. The amount of delay, per signal, is passed on to subsequent TDC conversion logic. After the signal is processed by the TDC logic, the signal containing N channels of data is split again back into N signals using a programmable logic device. The delays are then subtracted from the computed TDC conversion values for each channel.

More specifically, various embodiments, describe an intelligent multiplexing system or circuit that takes advantage of the fact that, although the gamma ray interactions in the detector follow Poisson statistics, the output signals from the TPO do not. The light produced by a gamma ray interaction in the scintillator has a temporal distribution that is exponential (or the sum of multiple exponentials). For the scintillators used in a Positron Emission Tomography (PET) detector, the decay time constants of the light distribution vary depending on the crystal, from 40-nanoseconds (nS) to 300-nS. Therefore, a substantial amount of light is being produced in the scintillator for 160-nS to 1200-nS. The electrical signal produced from the scintillation light may be processed to shorten its length and therefore enable a second gamma ray to be processed sooner (for example using tail clipping or tail extrapolation and subtraction). However, as the processed signal becomes shorter, the energy resolution of the detector becomes poorer. For PET detectors, a minimum acceptable signal length, that does not significantly affect energy resolution, is between 80-nS to 400-nS (more typically, 200-nS to 640-nS.)

Thus, various embodiments described herein takes advantage of this time to process each TPO signal multiple times when sending the TPO signal to a TDC. Various embodiments described herein utilize two different types of intelligent multiplexing devices. For example, one multiplexing device described herein processes the TPO signal multiple times using a pipe line architecture. In other embodiments, the multiplexing device utilizes the fact that the time between TPO signals from a given detector unit is long enough to make multiple attempts to gain access to a single TDC.

Accordingly, in one embodiment, N TPO signals are multiplexed in a first of an N-stage fixed-priority selection circuit. The selected signal from a single channel is sent to the TDC circuit and tagged as non-delayed. The non-selected signals are sent to an (identical) second stage selection circuit. The selected signal from the second stage is then sent to the TDC circuit and tagged as having a single delay.

In another embodiment, each of the N signals is sent through a series of N fixed-length delay lines. In this implementation, for each TPO signal the output of each delay line is logically OR'd together creating a time-multiplexed copy of each input signal. A centralized selection circuit then monitors the arrival time of the N input signals and selects a single channel that is passed to the TDC circuit, with no delay. The centralized selection circuit determines if there was a simultaneous arrival of multiple input signals and passes the delayed version of the signals onto the TDC circuit, also passing on the delay information.

In a further embodiment, each of the N input signals and its associated delay lines, are distributed across N physical circuits. In this embodiment, there is still a centralized selection circuit, but there exists communication between it and the N distributed input signal circuits.

Various embodiments may be used in combination with gamma ray detectors (also referred to herein as gamma detectors) in a positron emission tomography (PET) system having a PET detector assembly 20 shown in perspective view in FIG. 1. However, it should be appreciated that the gamma detectors and various embodiments may be implemented in different types of imaging and non-imaging systems. In the illustrated embodiment, the PET detector assembly 20 includes an electronics section 100 which is described in more detail below.

In various embodiments, the PET detector assembly 20 includes a plurality of detector modules 22 that are arranged in a ring to form the PET detector assembly 20. Each detector module 22 is assembled from a plurality of detector units 24. Thus, a plurality of detector units 24 is assembled to form a single detector module 22, and a plurality of detector modules 22 is assembled to form the PET detector assembly 20. In one embodiment, the PET detector assembly 20 includes twenty-eight detector modules 22 that are coupled together such that the PET detector assembly 20 has a ring shape. In some embodiments, each detector module 22 includes twenty detector units 24 that are arranged in a 4×5 matrix. It should be realized that the quantity of detector modules 22 utilized to form the PET detector assembly 20 is exemplary, and that the PET detector assembly 20 may have more than or fewer than twenty-eight detector modules 22. Moreover, it should be realized that quantity of detector units 24 utilized to form each detector module 22 is exemplary, and that the detector module 22 may have more than or fewer than twenty detector units 24.

Figure 2:
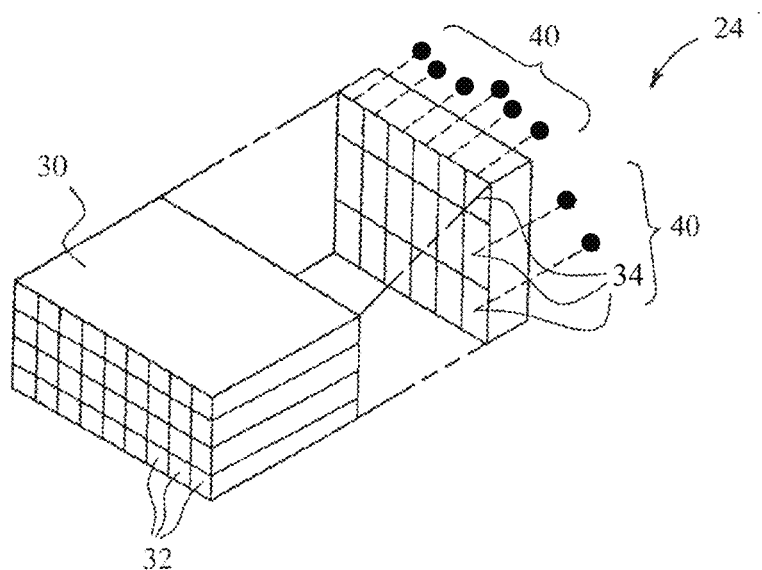
FIG. 2 is a perspective view of a detector unit formed in accordance with an embodiment.

FIG. 2 is a perspective view of an exemplary detector unit 24 that may form a portion of the detector module 22 shown in FIG. 1. In various embodiments, the detector unit 24 includes a scintillator block 30 having one or more scintillator crystals 32 that are arranged along an x-axis and a z-axis. In one embodiment, the scintillator block 30 has thirty-six crystals 32 that are arranged in a 4×9 matrix. However, it should be realized that the scintillator block 30 may have fewer than or more than thirty-six crystals 32, and that the crystals 32 may be arranged in a matrix of any suitable size. It also should be noted that the scintillator crystals 32 may be formed from any suitable material such as bismuth germinate (BGO), Cerium-doped Lutetium Yttrium Orthosilicate (LYSO) or Gadolinium Oxyorthosilicate (GSO), among others.

The detector unit 24 also includes a plurality of light sensors 34, illustrated as a plurality of photosensors, which may be any suitable photo-detectors that sense or detect light or other electromagnetic energy. In the illustrated embodiment, the light sensors 34 are Silicon Photomultipliers (SIPMs). The plurality of light sensors 34 are coupled at an end of the scintillator block 30 opposite a detector face 38. It should be noted that in some embodiments, such as to form a Depth-of-Interaction (DOI) detector, a reflector or reflective material may be provided on the detector face end.

In various embodiments, the detector unit 24 has eighteen light sensors 34 on each end of the scintillator block 30 that are arranged in a 3×6 matrix. However, it should be realized that the detector unit 24 may have fewer than or more than eighteen light sensors 34 and that the light sensors 34 may be arranged in a matrix of any suitable size. For example, some embodiments include 36, 54 or 100 crystals 32 having corresponding light sensors 34 that are arranged in a 6×6 matrix, 9×6 matrix or 10×10 matrix, respectively. It should be noted that in various embodiments, a one-to-one coupling between the light sensor 34 (e.g., a photosensor) and the crystal 32 is not provided, such that there is a one-to-multiple coupling between the light sensor 34 and the crystal 32. However, in other embodiments, a one-to-one coupling between the light sensor 34 (e.g., a photosensor) and the crystal 32 may be provided. Also, the light sensors 34 may have a different size or shape. In some embodiments, the light sensors 34 are larger than 3×3 mm$^2$. However, in other embodiments, larger or smaller light sensors 34 may be used, such as 4×6 mm$^2$ light sensors 34.

In one embodiment, the light sensors 34 are avalanche photodiodes that are connected in parallel and operated above a breakdown voltage in a Geiger mode. For example, the light sensors 34 may be SIPMs in various embodiments that are configured as single photon sensitive devices formed from an avalanche photodiode array on a silicon substrate. However, it should be noted that the light sensors 34 may be any type of light sensor, for example, any type of photosensor.

In operation, the scintillator crystals 32 convert the energy, deposited by a gamma ray impinging on the scintillator crystal 32, into visible (or near-UV) light photons. The photons are then converted to electrical analog signals by the light sensors 34. More specifically, when a gamma ray impinges on any one of the scintillators 32 in a detector unit 24, the scintillator detecting the gamma ray converts the energy of the gamma ray into visible light that is detected by the light sensors 34 in the detector unit 24. Thus, in the exemplary embodiment, each detector unit 24 is configured to output "n" analog signals 40.

Figure 3:
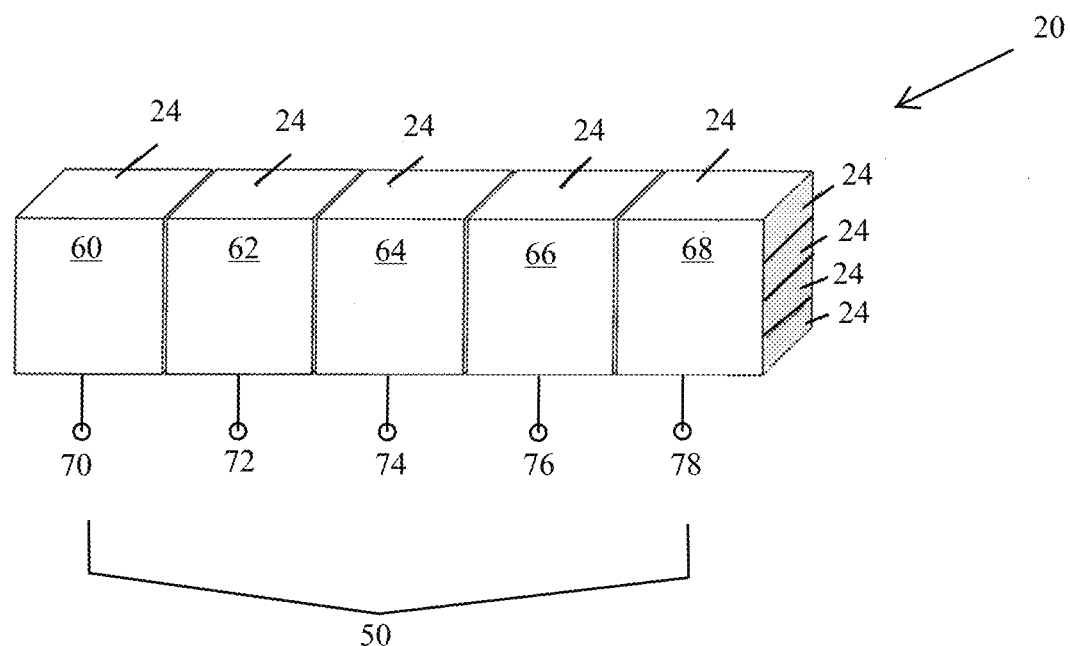
FIG. 3 is a perspective view of a detector module formed in accordance with an embodiment.

FIG. 3 is a perspective view of the detector module 22 shown in FIG. 1. As described above, each detector module 22 includes twenty detector units 24 that are arranged in a 4×5 matrix. In various embodiments, the twenty detector units 24 share four common timing channels. More specifically, because each module 22 is arranged in the 4×5 matrix, the outputs from five separate detector units 24 are configured to share a common timing channel. Thus, each detector module 22 is configured to output five electrical signals 50, wherein each electrical signal 50 represents an annihilation photon detected by one of the crystals 32 in the detector unit 24. For example, a detector unit 60 is configured to output a signal 70, a detector unit 62 is configured to output a signal 72, a detector unit 64 is configured to output a signal 74, a detector unit 66 is configured to output a signal 76, and a detector unit 68 is configured to output a signal 78.

Figure 4:
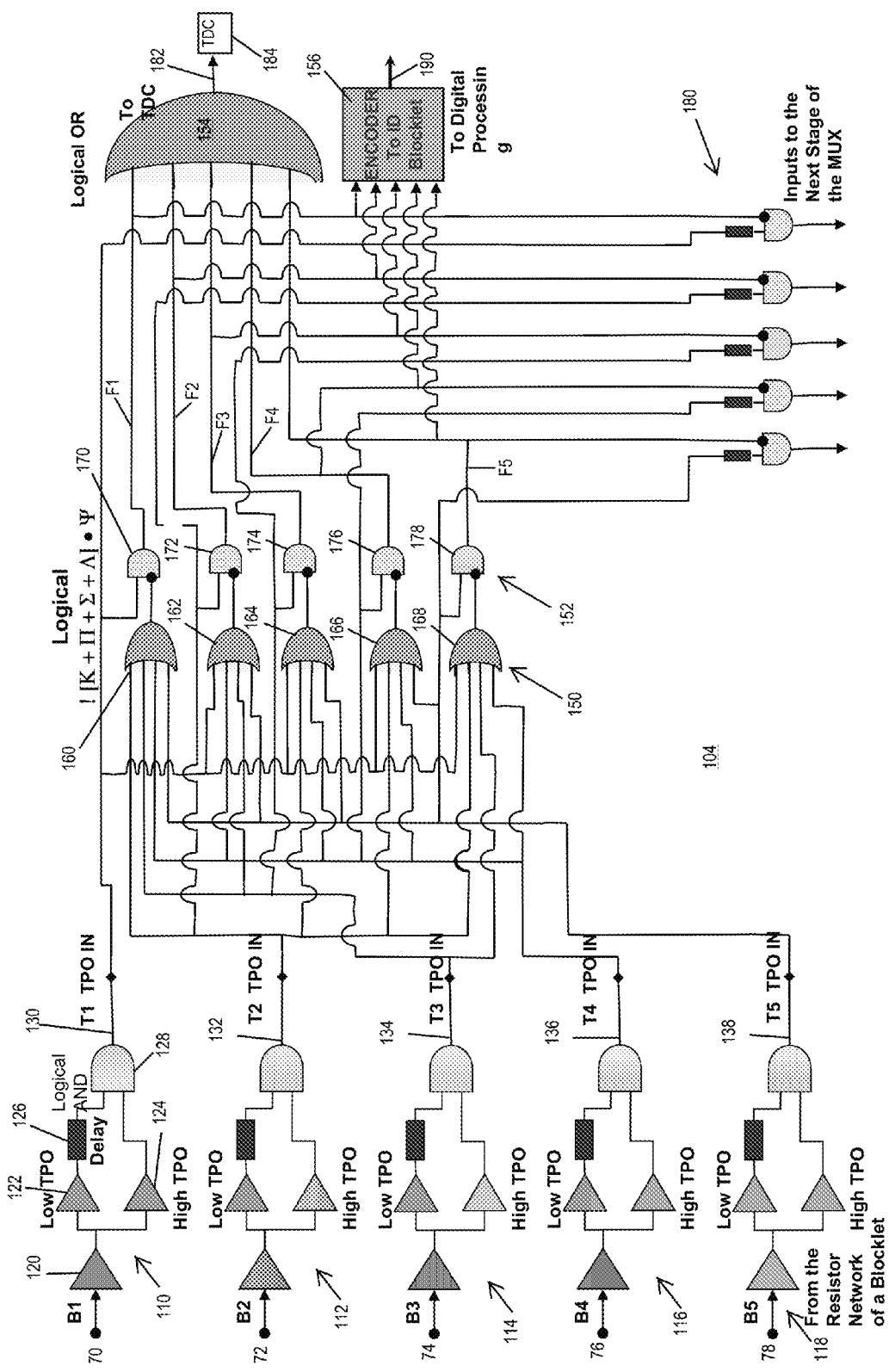
FIG. 4 is schematic illustration of a detector electronics section formed in accordance with various embodiments.

FIG. 4 is a schematic illustration of an exemplary detector electronics section 100 that is configured to receive the signals 70 . . . 78 output from the module 22 shown in FIG. 3. In the illustrated embodiment, the detector electronics section 100 includes a TPO circuit 102 and a multiplexing circuit 104. In operation, the TPO circuit 102 is configured to compare the total energy of each signal received from the detector unit 24 to a threshold signal value. When the total energy of the signal exceeds the threshold signal value, the signal is identified as an event detection pulse (EDP).

The TPO circuit 102 includes a plurality of individual TPO channels. For example, in the illustrated embodiment, the TPO circuit 102 includes a TPO channel 110 that is configured to receive the output signal 70 from the detector unit 60. Similarly, the TPO circuit 102 includes a TPO channel 112 that is configured to receive the output signal 72 from the detector unit 62, a TPO channel 114 that is configured to receive the output signal 74 from the detector unit 64, a TPO channel 116 that is configured to receive the output signal 76 from the detector unit 66, and a TPO channel 118 that is configured to receive the output signal 78 from the detector unit 68.

The operation of the TPO channel 110 is now explained in further detail. In the illustrated embodiment, the TPO channel 110 includes a voltage comparator 120, a low TPO comparator 122, a high TPO comparator 124, a delay 126, and an AND gate 128. In operation, the signal 70 is input to the first TPO channel 110 via the comparator 120. The comparator 120 compares the signal 70 to some predetermined value. If the signal 70 exceeds the predetermined value, the signal 70 is transmitted to both the low TPO comparator 122 and the high TPO comparator 124. In operation, the low TPO comparator 122 compares the signal 70 to some predetermined low threshold. If the value of the signal 70 is greater than the predetermined low threshold, the low TPO comparator 122 provides an output to the delay 126.

Similarly, the high TPO comparator 124 compares the signal 70 to some predetermined high threshold. If the value of the signal 70 is greater than the predetermined high threshold, the high TPO comparator 124 provides an output to the AND gate 128. Accordingly, in operation the TPO channel 110 receives the signal 70. In one embodiment, if the signal 70 is greater than both the low threshold and the high threshold, the delay 126 the delay line lines up the signals that are greater than both the low and high thresholds. The outputs from the delay 126 and the high TPO comparator 124 are both input to the AND gate 128 which in turn outputs a TPO signal 130 (T1) to the multiplexing circuit 104. It should be realized that although only the TPO channel 110 is described above in detail, the TPO channels 112 (T2), 114 (T3), 116 (T4), and 118 (T5) operate similarly to the TPO channel 110. Thus, the TPO channel 112 is configured to output a TPO signal 132, the TPO channel 114 is configured to output a TPO signal 134, the TPO channel 116 is configured to output a TPO signal 136, and the TPO channel 118 is configured to output a TPO signal 138.

In various embodiments, the TPO circuit 102 may be implemented as an application specific integrated circuit (ASIC), a Field Programmable Gate Array (FPGA), and/or any other suitable electronic device or devices. Optionally, the TPO circuit 102 may be implemented as a set of instructions on a computer.

The multiplexing circuit 104 includes N OR gates 150, N AND gates 152, a multiplexer 154, which may be implemented as a logical OR gate, and an encoder 156, which may be a state machine. In the illustrated embodiment, N is equal to five. In various embodiments, the value of N is set to be equal to the quantity of individual TPO channels in the TPO circuit 102. Thus, because the TPO circuit 102 includes five timing channels 110, 112, 114, 116, and 118, the multiplexing circuit 104 includes five OR gates 150 which include an OR gate 160, an OR gate 162, an OR gate 164, an OR gate 166, and an OR gate 168. Similarly, the multiplexing circuit 104 includes five AND gates 152 which include an AND gate 170, an AND gate 172, an AND gate 174, an AND gate 176, and an AND gate 178.

In the illustrated embodiment, the multiplexing circuit 104 is arranged in a pipe line architecture. A pipeline architecture as used herein means that the data processing elements are connected in series such that the output of one element is the input of the next element. For example, the signal 130 (T1) is input to the OR gates 160, 162, 164, 166, and 168 and the AND gate 170. The signal 132 (T2) is input to OR gates 160, 162, 164, 166, and 168 and the AND gate 172. The signal 134 (T3) is input to OR gates 160, 162, 164, 166, and 168 and the AND gate 174. The signal 136 (T4) is input to OR gates 160, 162, 164, 166, and 168 and the AND gate 176 and the signal 138 (T5) is input to OR gates 160, 162, 164, 166, and 168 and the AND gate 178.

Additionally, the output from the OR gate 160 is the input to the AND gate 170. Similarly, the output from the OR gate 162 is the input to the AND gate 172, the output from the OR gate 164 is the input to the AND gate 174, the output from the OR gate 166 is the input to the AND gate 176, and the output from the OR gate 168 is the input to the AND gate 178. Moreover, the outputs from the AND gates 170, 172, 174, 176, and 178 are input in parallel to both the multiplexer 154, the encoder 156, and a second set of AND gates 180 that are discussed in more detail below.

The operation of the multiplexing circuit 104 is now explained. In operation, the multiplexing circuit 104 is configured to process the signals 50 output from the detector module 20 after being processed by the TPO circuit 102. More specifically, the multiplexing circuit 104 is configured to receive five signals 130, 132, 134, 136, and 138 from the TPO circuit 102. The operation of the multiplexing circuit 104 will be explained in detail with respect to processing a single signal, e.g. the output signal 130. However, it should be realized that the signals 132, 134, 136, 138 are processed by the multiplexing circuit 104 similar to the output signal 130.

As described above, the signal 130 (T1) is provided as an input to the OR gates 162, 164, 166, and 168. Similarly, the signal 132 (T2) is provided as an input to gates 160, 164, 166, and 168; 134 (T3) is provided as an input to gates 160, 162, 166 and 168; 136 (T4) is provided as an input to gates 160, 162, 164, and 168; and 138 (T5) is provided as an input to OR gates 160, 162, 164, and 166. Outputs of the OR gates are used to block TPO signals 130, 132, 134, 136, and 138 from being sent multiple times to the multiplexing logical OR gate 154. Thus, the outputs from AND gates 170(F1), 172(F2), 174(F3), 176(F4), and 178(F5) operate in accordance with:

F1=T1 and not[T2 or T3 or T4 or T5]
F2=T2 and not[T1 or T3 or T4 or T5]
F3=T3 and not[T2 or T1 or T4 or T5]
F4=T4 and not[T2 or T3 or T1 or T5]
F5=T5 and not[T2 or T3 or T4 or T1]

As an example of how the multiplexing circuit 104 operates, assume that two TPO pulses (T1 and T5) occur at times t1 and t5, with t1<t5 and (t5−t1)<the pulse length of T1. In addition, let signals T2, T3, and T4 be zero from time t1 until after time t5. At t1, the output F1, output from the AND gate 170, becomes TRUE and will output a signal (F1) to the multiplexer 154. The multiplexer 154 then outputs a signal 182 to a Time-to-Digital Convertor (TDC) 184. In operation, the TDC 184 measures the arrival time of the detected annihilation photons by measuring a time difference between annihilation events using a universal clock.

Moreover, since F1 is TRUE, the corresponding AND gate 170 is enabled and T1 is transmitted to the next stage, e.g. the multiplexer 154. However, when T5 occurs, if T1 is still present, F5 remains FALSE, and the output from the AND gate 178 is enabled. However, when T1 is not present, and T5 occurs, the output F5 will be transmitted to the multiplexer 154 and then to the TDC 156. Thus, the AND gates that are FALSE prevent the respective signals from cascading to the next stage, e.g. the multiplexer 154 when its corresponding function output (Fn) signal was sent to the TDC.

As described above, in one mode of operation, a signal is output from the logic OR gate which is then input to the TDC 184 to time stamp the signal. Moreover, and concurrently with the time stamping operation, the encoder 156 is configured to output information 190 that indicates which detector unit 24 generated the signal that was transmitted to the TDC 184. For example, when F1 is TRUE, the corresponding AND gate 170 is enabled and T1 is also transmitted to the encoder 156. Thus, the encoder 156 "knows" which AND gate transmitted the signal. As a result, the encoder 156 is able to determine which detector unit 24 generated the signal. In various embodiments, the outputs from the TDC 184, e.g. the time stamped signal, and the output from the encoder 156, e.g. the location information of the detector unit generating the signal, are utilized for subsequent processing to identify coincidence events.

In various embodiments, additional stages may be added to the multiplexing circuit 104. For example, as described above the embodiment illustrated in FIG. 4 represents a 5:1 multiplexer. Therefore, the 5:1 multiplexing circuit 104 may be converted to, for example, a 10:1 multiplexer by replicating the multiplexing circuit 104 to form a second multiplexing circuit (not shown) to enable five additional signals to be input via the second set of AND gates 180. For example, additional multiplexing stages may be added to the multiplexing circuit 104 to reduce losses at high count rates. Moreover, the loads on the TDC 184 may be equalized by connecting [T1, T2, T3] from the ASIC to the inputs of the first stage shown in FIG. 4, and [T4, T5] from the ASIC to the inputs of the second stage (not shown), while connecting the AND outputs of the first stage for [T1, T2, T3] to the inputs of the second stage and the AND outputs of the second stage for [T4, T5] to the inputs of the first stage.

In various embodiments, the multiplexing circuit 104 may be implemented as an ASIC that is separate from the ASIC used to form the TPO circuit 102 or an FPGA, and/or any other electronic device or devices. Optionally, the multiplexing circuit 104 may be implemented on the same ASIC used to implement the TPO circuit 102.

Figure 5:
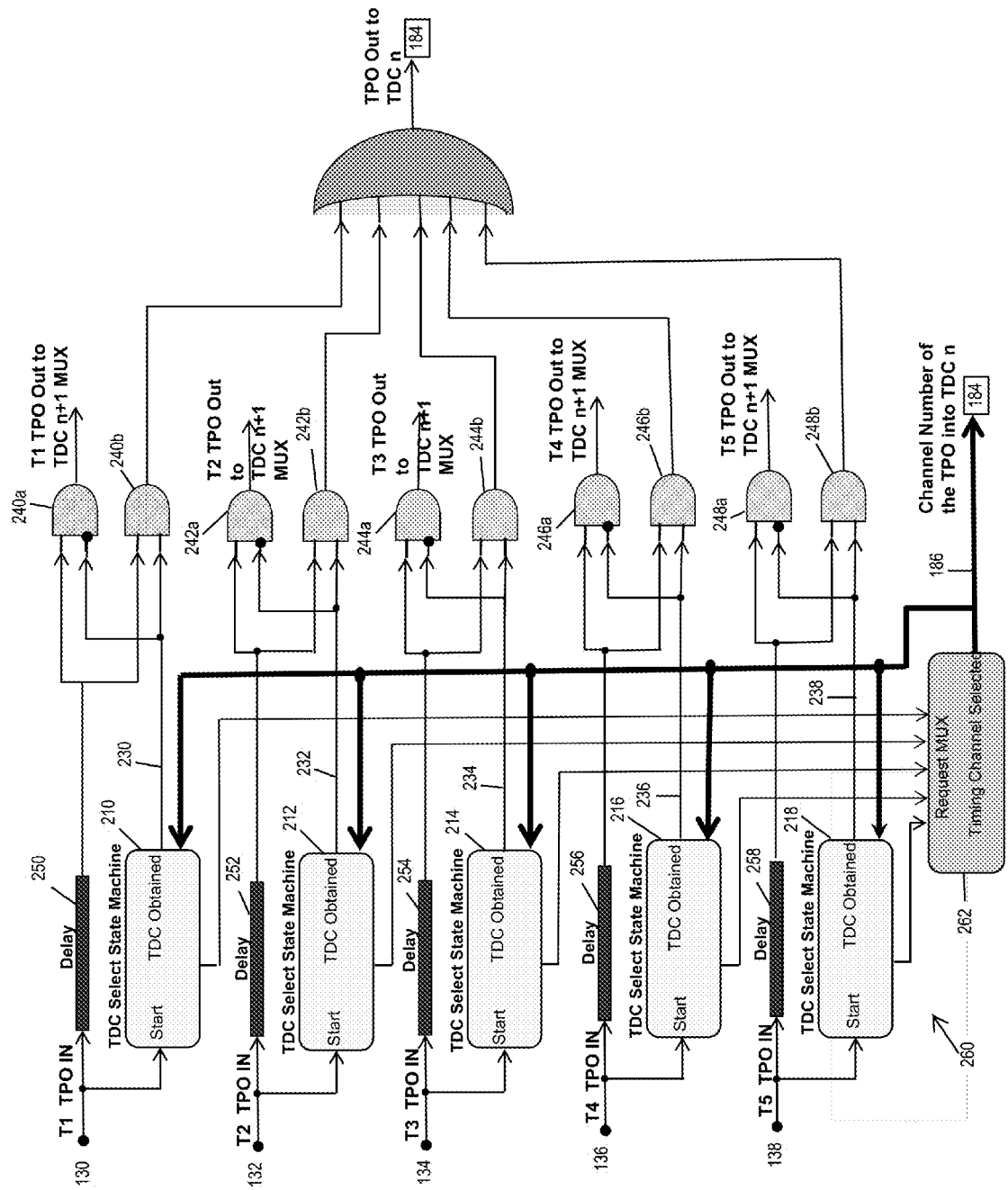
FIG. 5 is schematic illustration of another multiplexing circuit formed in accordance with various embodiments.

FIG. 5 is a schematic illustration of an exemplary multiplexing circuit 200 that may be utilized with the detector electronics section 100 to multiplex the signals 130, 132, 134, 136, and 138 shown in FIG. 4. In one embodiment, the multiplexing circuit 200 includes a plurality of TDC select state machines that are each configured to receive a respective signal from the TPO circuit 102 shown in FIG. 4. For example, the multiplexing circuit 200 includes a state machine 210 configured to receive the signal (T1), a state machine 212 configured to receive the signal (T2), a state machine 214 configured to receive the signal (T3), a state machine 216 configured to receive the signal (T4), and a state machine 218 configured to receive the signal (T5). A state machine as used herein is any device that is able to store the status of information at a given time and may operate to change the status or to cause an action.

The signals generated by each TDC select state machine are input to a pair of respective AND gates. For example, a signal 230 output from the TDC select state machine 210 is input to a pair of AND gates 240a and 240b, a signal 232 output from the TDC select state machine 212 is input to a pair of AND gates 242a and 242b, a signal 234 output from the TDC select state machine 214 is input to a pair of AND gates 244a and 244b, a signal 236 output from the TDC select state machine 216 is input to a pair of AND gates 246a and 246b, and a signal 238 output from the TDC select state machine 218 is input to a pair of AND gates 248a and 248b.

Additionally, the signal 130 is input to the pair of AND gates 240a and 240b via a delay 250, the signal 132 is input to the pair of AND gates 242a and 242b via a delay 252, the signal 134 is input to the pair of AND gates 244a and 244b via a delay 254, the signal 136 is input to the pair of AND gates 246a and 246b via a delay 256, and the signal 138 is input to the pair of AND gates 248a and 248b via a delay 258.

The operation of the multiplexing circuit 200 is now explained with reference to FIG. 5. As should be apparent, the multiplexing circuit 200 is similar to the multiplexer 100 shown in FIG. 4 but instead of using the function outputs Fn, e.g. the signal F1 . . . F5, the multiplexing circuit 200 uses a first set 260, e.g. state machines 210-218, to request the multiplexing operation, and a second state machine, referred to herein as a timing channel selector 262, to select and grant the multiplexing operation requested by one of state machines in the first set 260 of state machines.

For example, assume that a signal 130 is received at the state machine 210 at t1 and the signal 132 is received at the state machine 212 at t2, where t1<t2. In this case, the state machine 210 requests a multiplexing operation at approximately t1 and the state machine 212 requests a multiplexing operation at approximately t2. Accordingly, the requests for multiplexing are received at the timing channel selector 262 at approximately t1 and t2, respectively. In response, the timing channel selector 262 determines which request was made first in time, in this case t1. The timing channel selector 262 then selects the signal 130 for subsequent processing by the multiplexing circuit 200. More specifically, the timing channel selector 262 enables the signal 130 to be transmitted to the TDC 184 via the multiplexer 254 and the AND gate 240b. At time t2, if the signal 130 has been transmitted to the TDC 184, a second signal is sent by the timing channel selector 262 to the state machine 212 to enable the signal 132 to be transmitted to the TDC 184.

Thus, the timing channel selector 262 identifies which state machine has requested multiplexing and as a result, the timing channel selector may identify which detector unit 24 generated the signal. In various embodiments, the outputs from the TDC 184, e.g. the time stamped signal, and an output 286 from the timing channel selector 262, e.g. the location information of the detector unit 24 generating the signal, are utilized for subsequent processing to identify coincidence events.

In various embodiments, additional stages may be added to the multiplexing circuit 200. For example, the embodiment illustrated in FIG. 5 represents a 5:1 multiplexer. Therefore, the 5:1 multiplexing circuit 200 may be converted to, for example, a 10:1 multiplexer via the AND 240a, 242a, 244a, 246a, and 248a.

Figure 6:
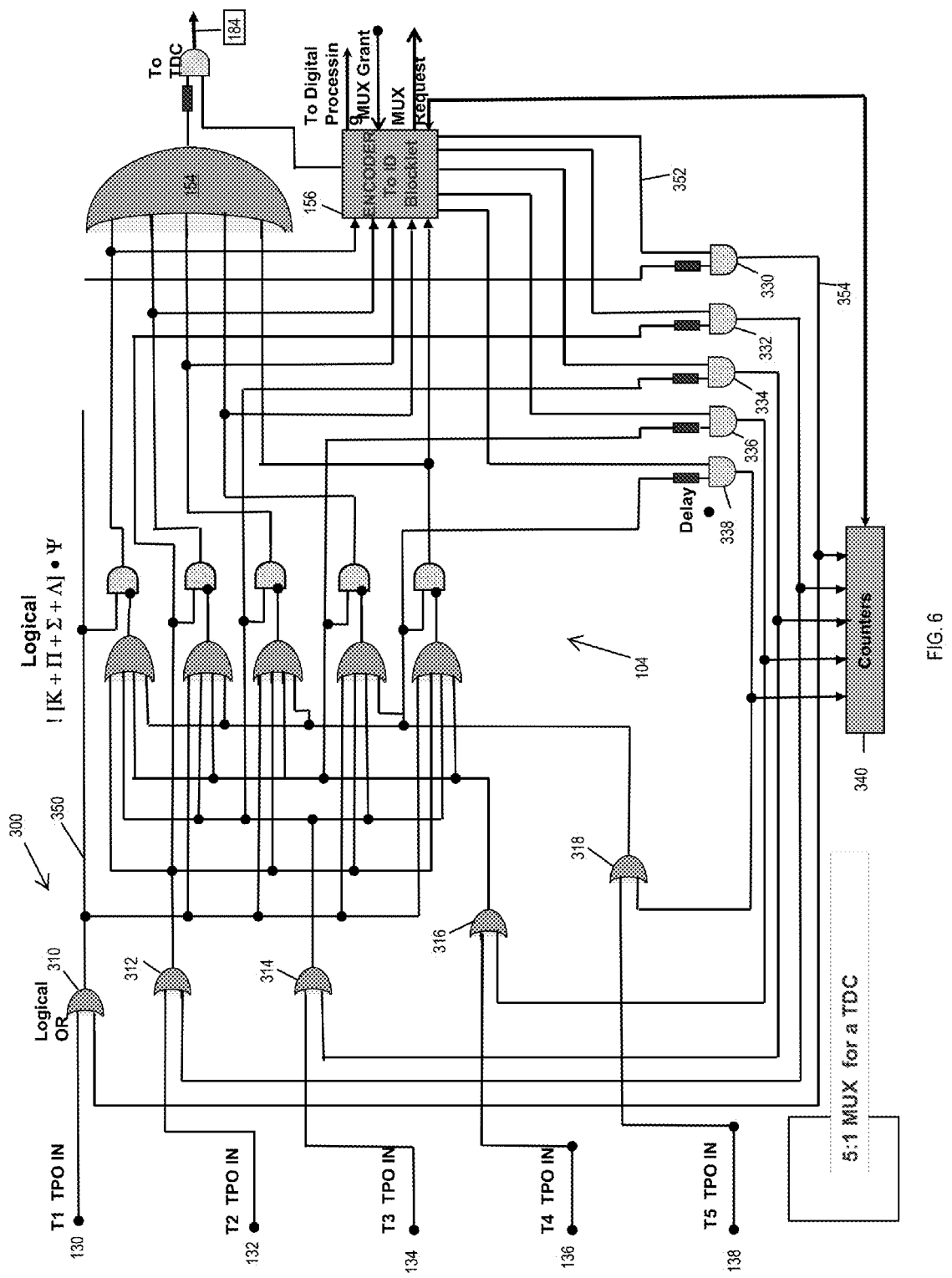
FIG. 6 is schematic illustration of another multiplexing circuit formed in accordance with various embodiments.

FIG. 6 is a schematic illustration of another exemplary multiplexing circuit 300 that may be utilized with the detector electronics section 100 to multiplex the signals 130, 132, 134, 136, and 138 shown in FIG. 4. In one embodiment, the multiplexing circuit 300 includes the multiplexing circuit 104 shown in FIG. 4. Moreover, the multiplexing circuit 300 also includes a plurality of logical OR gates. More specifically, the multiplexing circuit 300 includes a logical OR gate 310 that is configured to receive the TPO signal 130, a logical OR gate 312 that is configured to receive the TPO signal 132, a logical OR gate 314 that is configured to receive the TPO signal 134, a logical OR gate 316 that is configured to receive the TPO signal 136, and a logical OR gate 318 that is configured to receive the TPO signal 138. The multiplexing circuit 300 also includes a plurality of logical AND gates. More specifically, the multiplexing circuit includes a logical AND gate 330 that is configured to receive a signal from the logical OR gate 310, a logical AND gate 332 that is configured to receive a signal from the logical OR gate 312, a logical AND gate 334 that is configured to receive a signal from the logical OR gate 314, a logical AND gate 336 that is configured to receive a signal from the logical OR gate 316, and a logical AND gate 338 that is configured to receive a signal from the logical OR gate 318. The multiplexing circuit 300 also includes a counter circuit 340.

In operation, each of the logical OR gates functions as a feedback device. For example, assume that the TPO signal 130 is initially transmitted to the logical OR gate 310. Upon receiving the TPO signal 310, the logical OR gate 310 outputs a signal 350 to the encoder 156 and the multiplexer 154, via the logical AND gates and logical OR gates, for subsequent processing as described above. Additionally, the signal 350 is also transmitted to the logical AND gate 330.

The encoder 156 receives the signal 350, and in response transmits a signal 352 to the logical AND gate 330. Thus, when the input from the logical OR gate 310 is TRUE and the input from the encoder 156 is TRUE, the logical AND gate transmits a signal 354 to the counter 340. In response, the counter 340 increments an internal counter to 1 which denotes that the TPO signal 130 has been processed by the multiplexing circuit one time. The counter 340 therefore counts the quantity of times the TPO signal 130 has been processed by the multiplexing circuit 300. In various embodiments, the counter 340 is controlled by the encoder 156 such that when the TPO has been processed a predetermined number of times by the multiplexing circuit 300, the encoder 156 is configured to terminate the TPO pulse 130.

Figure 7:
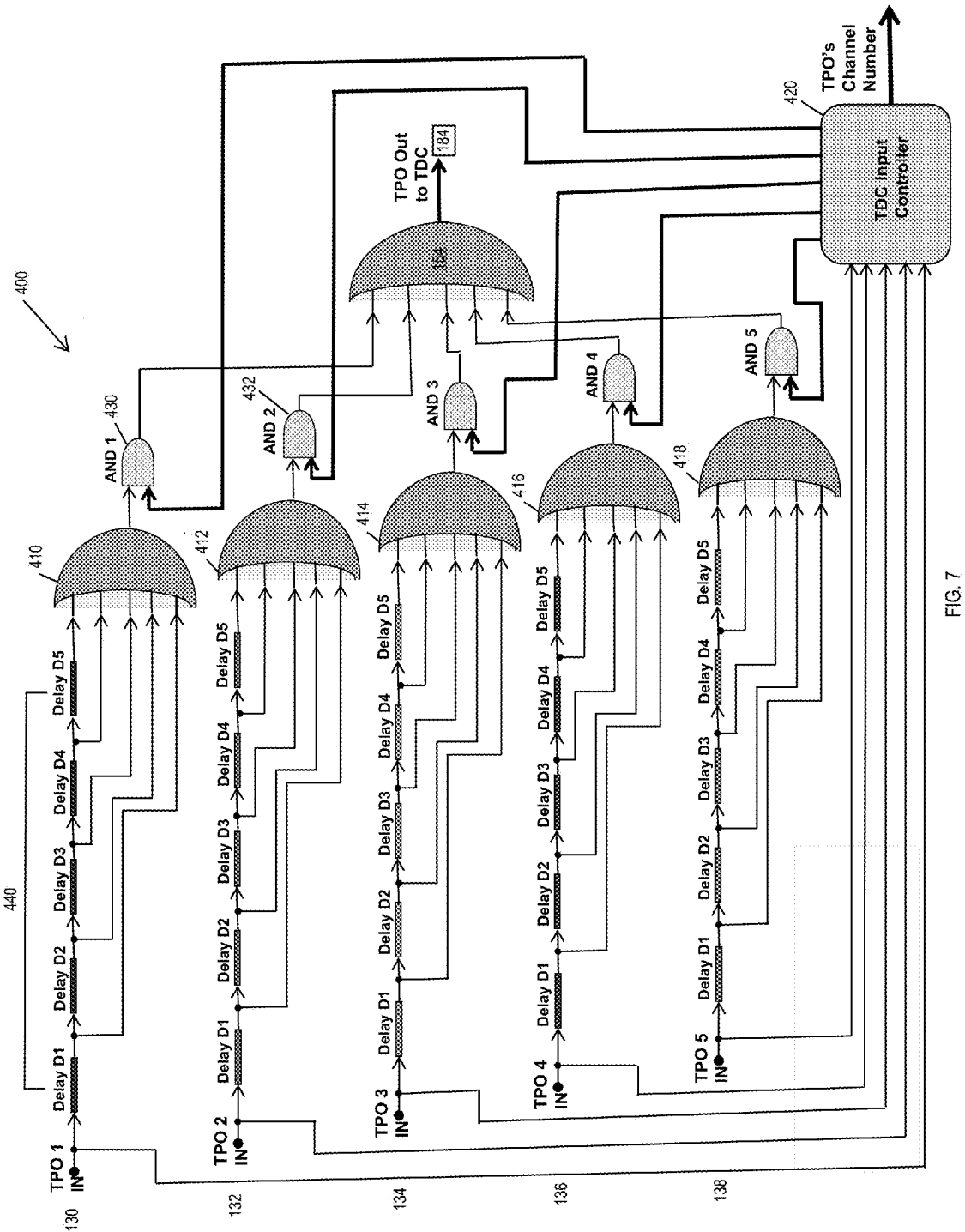
FIG. 7 is schematic illustration of another multiplexing circuit formed in accordance with various embodiments.

FIG. 7 is a schematic illustration of another exemplary multiplexing circuit 400 that may be utilized with the detector electronics section 100 to multiplex the signals 130, 132, 134, 136, and 138 shown in FIG. 4. In general, the multiplexing circuits 400 are configured based on the knowledge that a time between TPO pulses from a given detector unit 24 is long enough to enable a single TPO pulse to make multiple attempts to gain access to a single TDC 184. For example, if the TDC 184 is busy processing the TPO signal 130, for example, when other detector units 24 also have TPO outputs ready to be processed, the multiplexing circuit 400 enables the TPO signals that have not been processed by the TDC 184 to be processed by the circuit using multiple delays 440.

Accordingly, the multiplexing circuit 400 includes a logical OR gate 410 that is configured to process the multiple delayed attempts of TPO signal 130, a logical OR gate 412 that is configured to process the multiple delayed attempts of TPO signal 132, a logical OR gate 414 that is configured to process the multiple delayed attempts of TPO signal 134, a logical OR gate 416 that is configured to process the multiple delayed attempts of TPO signal 136, and a logical OR gate 418 that is configured to process the multiple delayed attempts of TPO signal 138. The multiplexing circuit 400 also includes a TDC input controller 420, that uses the TPO input signals 130, 132, 134, 136, and 138, to determine which of the delayed attempts of the input signals are passed through to the TPO MUX 154.

In operation, assume that at a time t1 the output from the logical OR gate 410 is TRUE. Moreover, assume that the outputs from the logical OR gates 412, 414, 416, and 418 are FALSE. In this example, the TDC input controller 420 selects the output from the logical OR gate 410 for processing by the multiplexer 154 and the TDC 184. Additionally, assume that at a time t2, the TDC input controller 420 determines that TPO signal 132 is ready to be processed by the TDC 184 and the TDC 184 is still processing the output from the logical OR gate 410. In this example, the output from the TDC input controller 420 to the AND gate 430 is FALSE and the TPO signal 132 is not processed at time t2. After a predetermined quantity of time (Delay 1), the TDC input controller 420 again determines whether the TPO signal 132 is ready to be processed by the TDC 184, e.g. the TDC 184 is not processing any other TPO signals. If the TDC 184 is not processing any other TPO signals, the TDC input controller 420 signal to the logical AND gate 432 is now TRUE and the TPO signal 132 is transmitted to the TDC 184 for processing. The above process is iteratively repeated for a plurality of delay times 440. Accordingly, although FIG. 7 illustrates five potential delay times 440 for processing the TPO signal, the multiplexing circuit 400 may have fewer than five or more than five delay times 440. In various embodiments, the lengths of each of the delays is selected to be larger than a duration of the TPO signal such that the output of the logical OR gate is a string of TPO signals separated by known delays.

Figure 8:
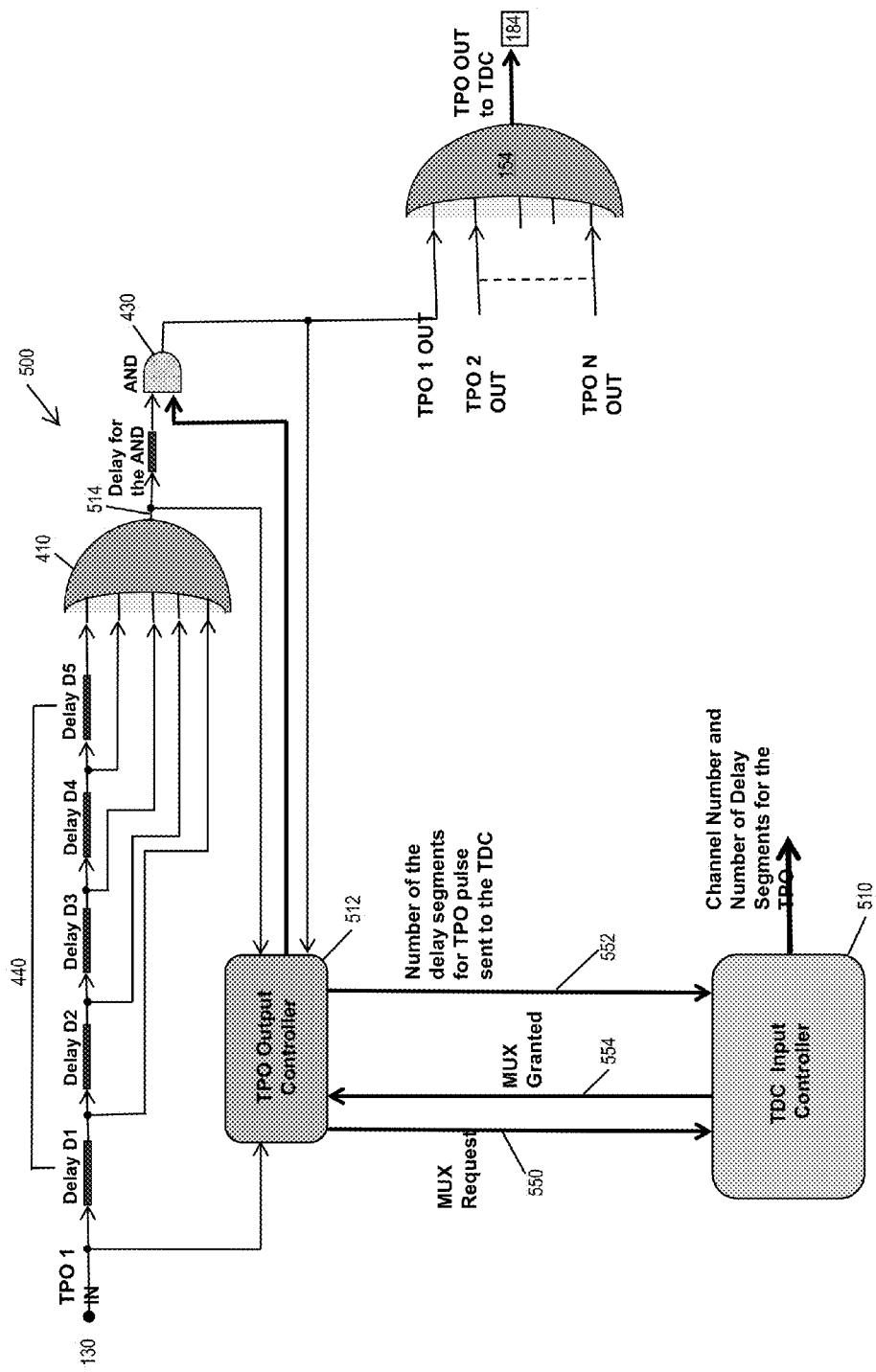
FIG. 8 is schematic illustration of another multiplexing circuit formed in accordance with various embodiments.

FIG. 8 is a schematic illustration of another exemplary multiplexing circuit 500 that may be utilized with the detector electronics section 100 to multiplex the signals 130, 132, 134, 136, and 138 shown in FIG. 4. In general, the multiplexing circuit 500 is similar to the multiplexing circuit 400 described above and is therefore configured based on the knowledge that a time between TPO pulses from a given detector unit 24 is long enough to enable a single TPO pulse to make multiple attempts to gain access to a single TDC 184. For example, if the TDC 184 is busy processing the TPO signal 130, for example, when other detector units 24 also have TPO outputs ready to be processed, the multiplexing circuit 400 enables the TPO signals that have not been processed by the TDC 184 to be processed by the circuit using multiple delays.

Accordingly, the multiplexing circuit 500 includes a TDC input controller 510 and a TDC output controller 512, the logical OR gate 410, and a plurality of delays 440. It should be realized that although only a single TPO signal is illustrated, e.g. TPO signal 130, the multiplexing circuit 500 includes additional circuitry to process other TPO signals and that the circuitry shown in FIG. 8 for the TPO signal 130 is exemplary only.

The TDC input controller 510 is configured to receive and granting multiplexing requests similar to the TDC input controller 420 shown in FIG. 7 via the TDC output controller 512. Moreover, it should be realized that each TPO signal received by the multiplexing circuit 500 is processed by a separate TDC output controller 512.

In operation, when the TPO signal 130 is received, the TPO signal 130 is transmitted through multiple delays 440 to generate a string of TPO pulses similar to the embodiment described in FIG. 7. The TPO signal 130, a string of TPO pulses 514 out of the OR gate 410, and the output of the AND gate 430 are transmitted to the TPO Output Controller. In various embodiments, at least one delay 440 has been added between the OR gate 410 and the output enabling the AND gate 430 to accommodate the multiplexing Request-to-Grant delay. When the TPO output controller 512 receives the input TPO pulse 130, the TPO output controller 512 transmits a multiplexing request signal 550 to the TDC input controller 510. The TDC input controller 510 counts the TPO pulses 552 at the output of the OR gate 410 to determine how many delay segments 440 the TPO pulse 130 has passed thru, before receiving a multiplexing grant signal 554. When the TDC input controller 510 determines that the TDC 184 is available, The TDC input controller 510 transmits the multiplexing grant signal 554 to the TPO output controller 512. In response to the multiplexing grant signal 554, the TPO output controller 512 waits for the next leading edge of one of the TPO pulses to occur at the output of the OR gate and enables the AND gate 430. When the TPO output controller detects the falling edge of the TPO pulse at the output of the AND gate 430, the TPO output controller 512 disables the AND gate 430, and rescinds the multiplexing request signal 550.

When the TPO pulse has been sent to the TDC 184, the TPO output controller 512 transmits a signal that includes the number of delay segments 440, to the TDC input controller 510. The TDC input controller 510 then combines this information with the channel number that was granted, and transmits this information to the TDC 184. In one embodiment, when the multiplexing grant signal 554 is not received before the number of TPO pulse reaching the output of the OR gate 410 is equal to the number of delays 440, the TPO output controller 512 rescinds the multiplexing request signal 550 and increments an event loss counter (not shown).

Figure 9:
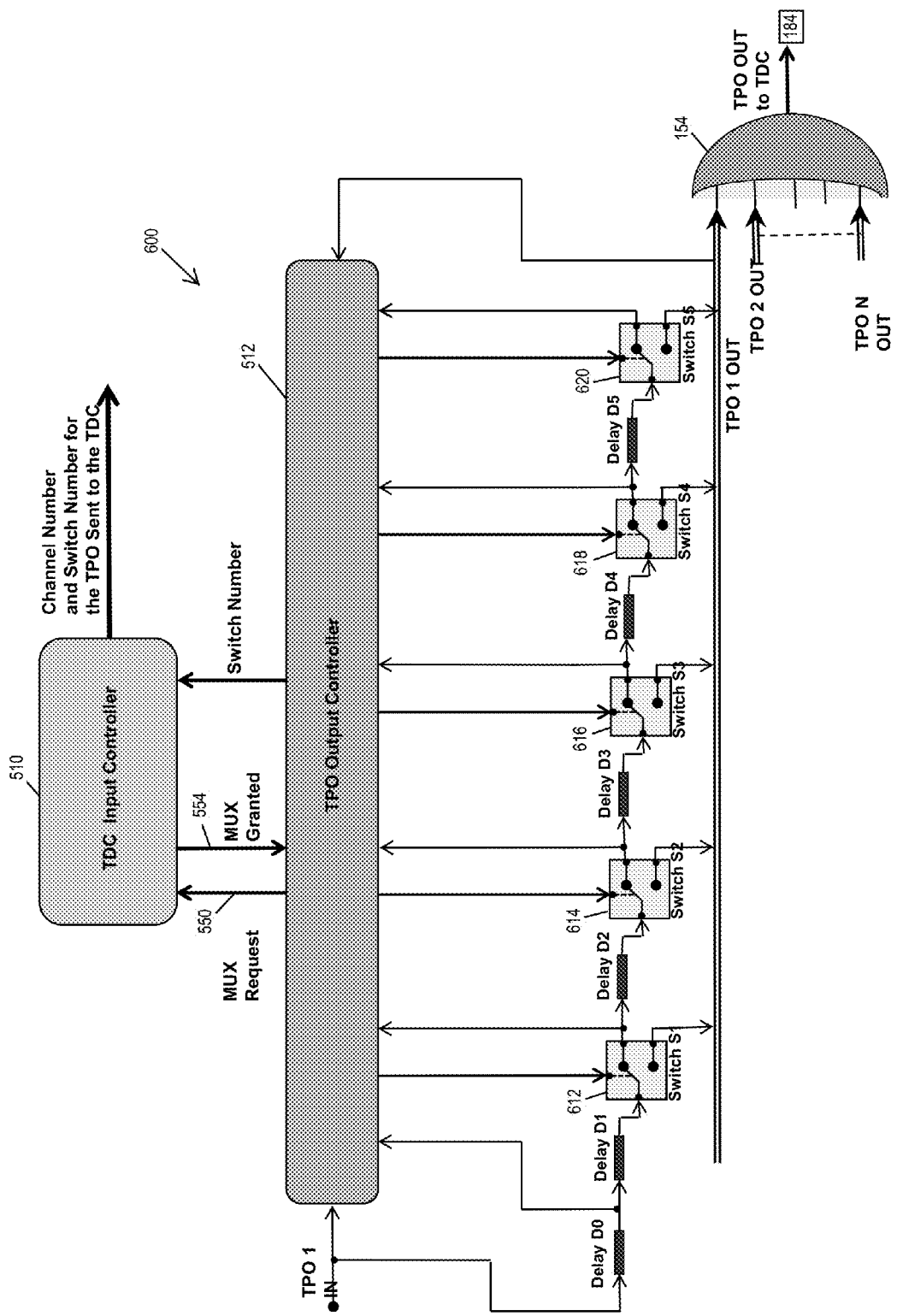
FIG. 9 is schematic illustration of another multiplexing circuit formed in accordance with various embodiments.

FIG. 9 is a schematic illustration of another exemplary multiplexing circuit 600 that may be utilized with the detector electronics section 100 to multiplex the signals 130, 132, 134, 136, and 138 shown in FIG. 4. In general, the multiplexing circuit 600 is similar to the multiplexing circuit 500 described above. Thus, the multiplexing circuit 600 includes the TDC input controller 510 and the TDC output controller 512.

In this example, a plurality of delays are implemented using a plurality of switches 612, 614, 616, 618, 620 instead of the AND and OR gates utilized to implement the delays shown in the multiplexing circuit 500. In operation, when the TPO output controller 512 detects a TPO input pulse 130, the multiplexing request signal 550 is transmitted to the TPO input controller, that enables at least one of the switches 610, and sends a grant back to the TPO output controller indicating which one of the switches 610 was enabled. The switches 610 either pass the TPO signal 130 from one delay switch to the next, for example, from switch 612 to switch 614, etc, or drop the TPO signal because the multiplexing grant signal 554 has not been received by the TPO output controller 512.

Figure 10:
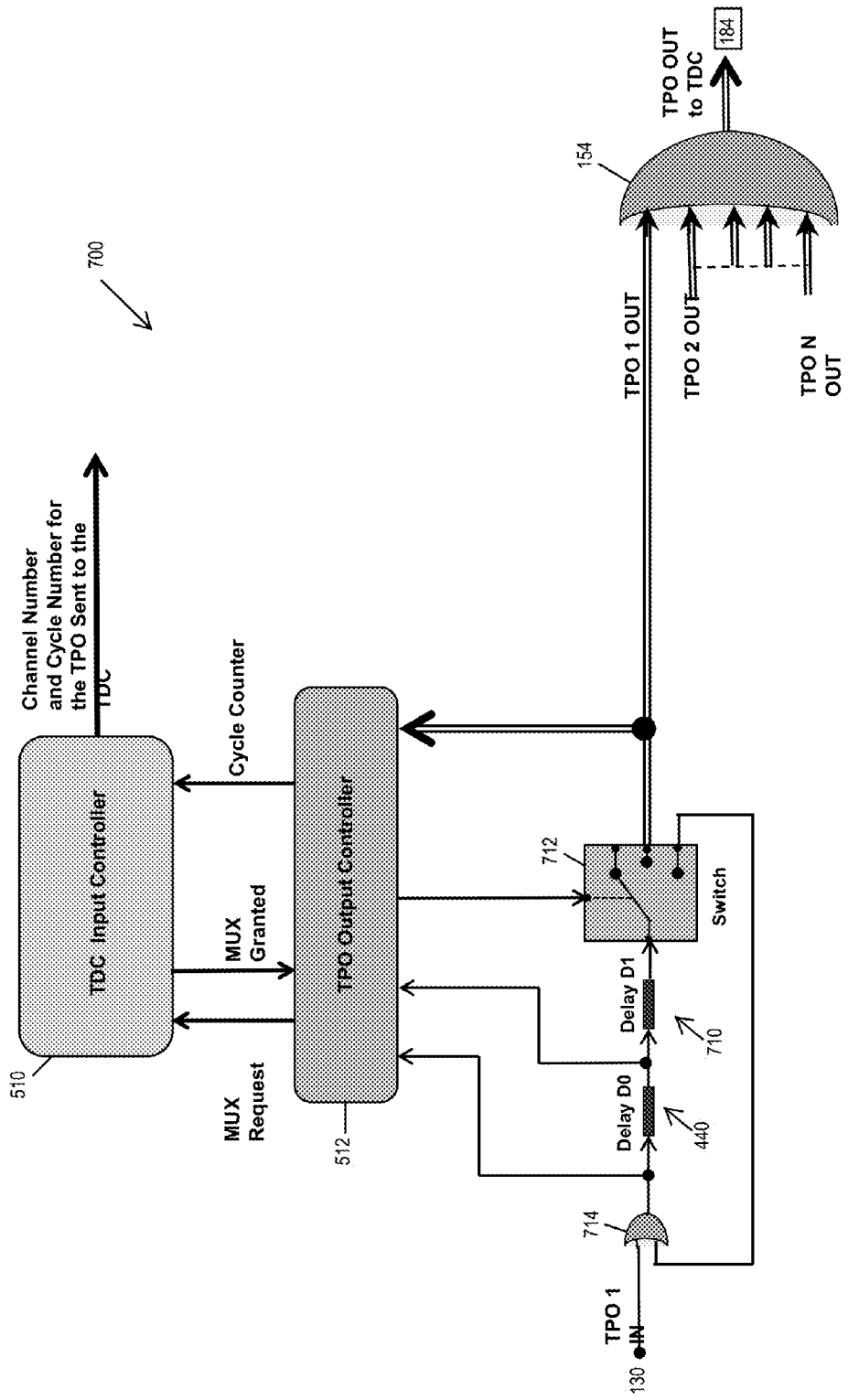
FIG. 10 is schematic illustration of another multiplexing circuit formed in accordance with various embodiments.

FIG. 10 is a schematic illustration of another exemplary multiplexing circuit 700 that may be utilized with the detector electronics section 100 to multiplex the signals 130, 132, 134, 136, and 138 shown in FIG. 4. In general, the multiplexing circuit 700 performs similarly to the multiplexing circuit 300 shown in FIG. 6. In operation, the multiplexing circuit 700 reduces the number of delay segments added to the TPO signal 130 by transmitting a delayed TPO signal 170 back into the input of the circuit, e.g. back to the TPO output controller 512. In the embodiment shown in FIG. 10, the delays added to the TPO signal 130 are implemented using a plurality of switches 712 and an output OR gate 714.

Figure 11:
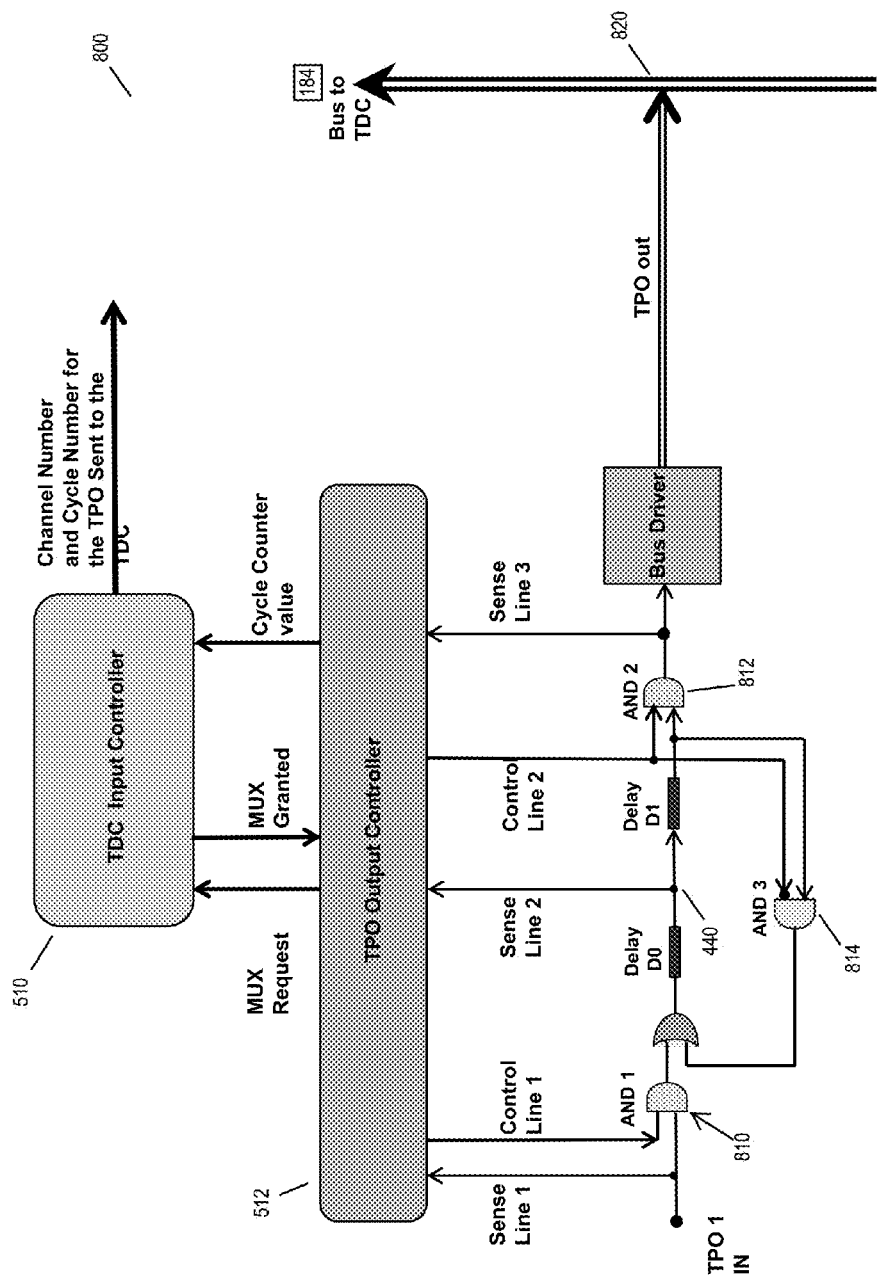
FIG. 11 is schematic illustration of another multiplexing circuit formed in accordance with various embodiments.

FIG. 11 is a schematic illustration of another exemplary multiplexing circuit 800 that may be utilized with the detector electronics section 100 to multiplex the signals 130, 132, 134, 136, and 138 shown in FIG. 4. In general, the multiplexing circuit 800 is similar to the multiplexing circuit 700 shown in FIG. 10. More specifically, in the embodiment of FIG. 11, the delays are implemented using AND gates 810, 812, and 814, respectively, and a bus 820.

Figure 12:
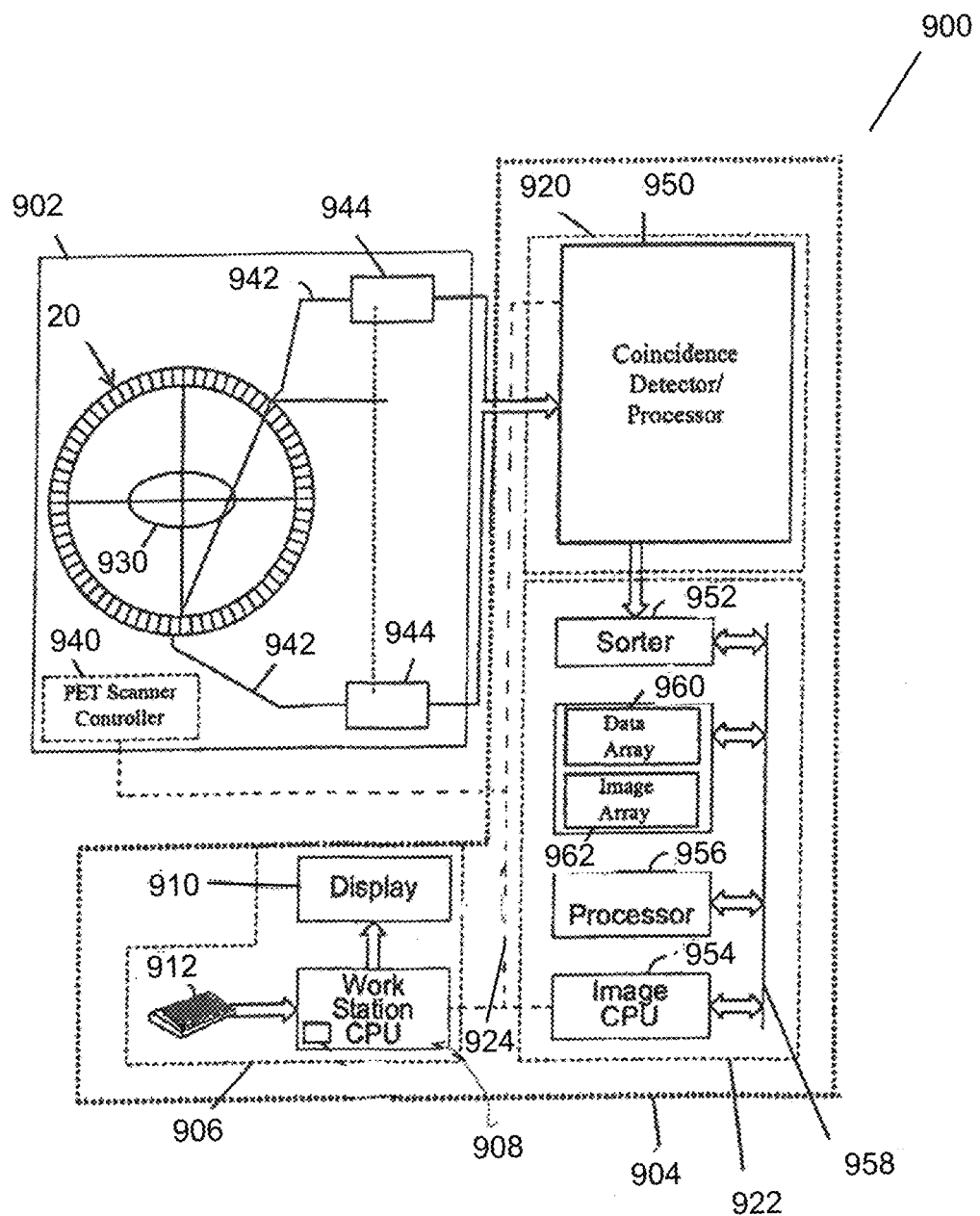
FIG. 12 is a block schematic diagram of a portion of an imaging system formed in accordance with various embodiments.

FIG. 12 is a block diagram of an exemplary embodiment of a PET system 900 that may include the various multiplexers described herein. The PET system 900 includes a gantry 12. The PET imaging system 900 also includes a controller 904 to control image reconstruction processes. The controller 904 includes an operator workstation 906. The operator workstation 906 includes a computer 908, a display 910, and an input device 912. The controller 904 also includes a data acquisition processor 920 and an image reconstruction processor 922. The gantry 902, the operator workstation 906, the data acquisition processor 920 and the image reconstruction processor 922 are interconnected via a communication link 924 (e.g., a serial communication or wireless link). In operation, scan data is acquired and transmitted to the data acquisition processor 920. The data acquired by data acquisition processor 920 is reconstructed using the image reconstruction processor 922.

The PET imaging system 900 may include, for example, a plurality of detector rings. One such detector ring, detector ring 20, is illustrated in FIG. 1. The detector ring 20 includes a central opening, in which an object 930 may be positioned, using, for example, a motorized table (not shown). The motorized table moves the object 930 into the central opening of detector the ring 20, in response to one or more commands received from operator workstation 906. A PET scanner controller 940, also referred to as a gantry controller, is provided (e.g., mounted) in the gantry 902. The PET scanner controller 940 responds to the commands received from the operator workstation 906 through the communication link 924. Therefore, the operation of the PET imaging system 900 is controlled from the operator workstation 906 through the PET scanner controller 940.

In various embodiments, the detector ring 202 includes a plurality of detector elements, as described above, for performing a PET scan of the object 930. In operation, when a photon collides with one of the detector elements, the photon produces a scintilla. The photosensor produces an analog signal on a communication line 942 when a scintillation event occurs. A set of acquisition circuits 944 is provided to receive these analog signals. The acquisition circuits 944 include analog-to-digital converters to digitize analog signals, processing electronics, such as the TPO circuit 102, to quantify event signals, at least one of the multiplexers described herein and a time measurement unit, such as the TDC 184, to determine time of events relative to other events in the system. For example, this information indicates when the event took place and the identity of the scintillation crystal that detected the event. The acquisition circuits 944 produce digital data indicating the location, time and total energy of the event. This event data is transmitted through a communication link, for example, a cable, to a coincidence detector or processor 950.

The coincidence detector 950 receives the event data packets from the acquisition circuits 944 and determines if any two of the detected events are in coincidence. In this context, the coincidence is determined by a number of factors. First, the time markers in each event data packet must be within a predetermined time period, for example, 6 ns, of each other. Secondly, the LOR formed by a straight line joining the two detectors that detect the coincidence event should pass through the field of view in detector 20. Events that cannot be paired are discarded. Coincident event pairs are recorded as a coincidence data packet that is communicated through a communication link to a sorter 952 in the image reconstruction processor 922.

The image reconstruction processor 922 includes the sorter 952, a memory module (not shown), an image CPU 954, an array processor 956, and a back-plane bus 958. The sorter 952 counts all events that occur along each projection ray and organizes them into a coincidence data set. In one embodiment, this data set is organized as a data array 960, referred to as a sinogram. The data array 960 is stored in the memory module. The back-plane bus 958 is linked to the communication link 924 through the image CPU 954, which controls communication through the back-plane bus 958. The array processor 956 is also connected to the back-plane bus 958, receives the data array 960 as an input, and reconstructs images in the form of the image arrays 962. The resulting image arrays 962 are stored in the memory module.

The images stored in the image array 962 are communicated by the image CPU 954 to the operator workstation 906. The computer 908 is configured to process the scan data received from the detector elements and reconstruct an image of the object 930.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A multiplexing circuit for a positron emission tomography (PET) detector, the PET detector having a plurality of detector units, said multiplexing circuit comprising:
    a delay circuit; and
    a multiplexer communicating with the delay circuit, the delay circuit configured to receive a plurality of timing pickoff (TPO) signals from a plurality of positron emission tomography (PET) detector units, add a delay time to a portion of the plurality of TPO signals, and transmit the TPO signals based on the delay time to the multiplexer, the multiplexer configured to a multiplex the TPO signals and output a single TPO signal from the plurality of TPO signals to a Time-to-Digital Convertor (TDC).

2. The multiplexing circuit of claim 1, wherein the delay circuit comprises:
    a plurality of logical OR gates each being configured to receive the plurality of TPO signals; and
    a logical AND gated coupled in series to each respective logical OR gate, each logical AND gate being configured to prohibit at least some of the TPO signals from being transmitted to the multiplexer.

3. The multiplexing circuit of claim 1, wherein the delay circuit comprises a plurality of logical AND gates configured to receive a second set of TPO signals from a different second multiplexing circuit.

4. The multiplexing circuit of claim 1, wherein the delay circuit comprises:
    a plurality of state machines, each state machine configured to receive a respective TPO signal and output a multiplexing request signal in response to the received TPO signal; and
    a timing channel selector configured to:
        receive the multiplexing request signals from the plurality of state machines;
        select at least one of the received multiplexing request signals; and
        transmit a request granted signal to the state machine transmitting the selected request signal, the state machine transmitting the TPO signal to the multiplex in response to the request grant signal.

5. The multiplexing circuit of claim 1, wherein the delay circuit comprises:
    a counter circuit configured to count a quantity of times a TPO signal has been processed by the multiplexing circuit; and
    an encoder configured to terminate the TPO signal when the count exceeds a predetermined threshold.

6. The multiplexing circuit of claim 1, wherein the delay circuit comprises:
    a TDC input controller configured to,
    receive a request to process a first TPO signal;
    determine if the multiplexer is processing a different second TPO signal; and
    iteratively delay processing the first TPO signal until the processing of the second TPO signal is completed.

7. The multiplexing circuit of claim 1, wherein the delay circuit comprises:
    a TDC output controller configured to count a quantity of delays added to a TPO signal; and
    a TDC input controller configured to receive the count from the TDC output controller and transmit the count and the detector unit generating the TPO signal to the TDC.

8. The multiplexing circuit of claim 7, wherein the delays are counted using a plurality of switches.

9. An imaging system comprising:
    a gantry;
    a detector coupled to the gantry, the detector including a plurality of detector units; and
    a multiplexing circuit coupled to the plurality of detector units, the multiplexing circuit including,
    a delay circuit; and
    a multiplexer communicating with the delay circuit, the delay circuit configured to receive a plurality of timing pickoff (TPO) signals from a plurality of positron emission tomography (PET) detector units, add a delay time to a portion of the plurality of TPO signals, and transmit the TPO signals based on the delay time to the multiplexer, the multiplexer configured to a multiplex the TPO signals and output a single TPO signal from the plurality of TPO signals to a Time-to-Digital Convertor (TDC).

10. The imaging system of claim 9, wherein the delay circuit comprises:
    a plurality of logical OR gates each being configured to receive the plurality of TPO signals; and a logical AND gated coupled in series to each respective logical OR gate, each logical AND gate being configured to prohibit at least some of the TPO signals from being transmitted to the multiplexer.

11. The imaging system of claim 9, wherein the delay circuit comprises a plurality of logical AND gates configured to receive a second set of TPO signals from a different second multiplexing circuit.

12. The imaging system of claim 9, wherein the delay circuit comprises:
   a plurality of state machines, each state machine configured to receive a respective TPO signal and output a multiplexing request signal in response to the received TPO signal; and
   a timing channel selector configured to:
      receive the multiplexing request signals from the plurality of state machines;
      select at least one of the received multiplexing request signals; and
      transmit a request granted signal to the state machine transmitting the selected request signal, the state machine transmitting the TPO signal to the multiplex in response to the request grant signal.

13. The imaging system of claim 9, wherein the delay circuit comprises:
   a counter circuit configured to count a quantity of times a TPO signal has been processed by the multiplexing circuit; and
   an encoder configured to terminate the TPO signal when the count exceeds a predetermined threshold.

14. The imaging system of claim 9, wherein the delay circuit comprises:
   a TDC input controller configured to,
   receive a request to process a first TPO signal;
   determine if the multiplexer is processing a different second TPO signal; and
   iteratively delay processing the first TPO signal until the processing of the second TPO signal is completed.

15. The imaging system of claim 9, wherein the delay circuit comprises:
   a TDC output controller configured to count a quantity of delays added to a TPO signal; and
   a TDC input controller configured to receive the count from the TDC output controller and transmit the count and the detector unit generating the TPO signal to the TDC.

16. The imaging system of claim 15, wherein the delays are counted using a plurality of switches.

17. A method of operating an imaging system that includes a multiplexing circuit, said method comprising:
   receiving, at a delay circuit, a plurality of timing pickoff (TPO) signals generated by a plurality of detector units;
   adding a delay time to a portion of the plurality of TPO signals;
   transmitting the TPO signals based on the delay time to a multiplexer;
   multiplexing the TPO signals using the multiplexer;
   transmitting a single TPO signal from the multiplexer to a Time-to-Digital Convertor (TDC); and
   identifying which detector unit generated the single TPO signal based on a delay time added to the single TPO signal.

18. The method of claim 17, wherein the imaging system comprises a positron emission tomography imaging system.

19. The method of claim 17, further comprising:
   receiving the plurality of TPO signals at a plurality of logical OR gates; and
   prohibiting at least some of the TPO signals from being transmitted to the multiplexer using a logical AND gated coupled in series to each respective logical OR gate.

20. The method of claim 17, further comprising receiving a second set of TPO signals from a different second multiplexing circuit at a plurality of logical AND gates.

* * * * *